(12) United States Patent
Kuse et al.

(10) Patent No.: US 11,773,594 B2
(45) Date of Patent: Oct. 3, 2023

(54) REINFORCEMENT FOR CEMENT- AND STEEL-BASED STRUCTURES

(71) Applicants: Kolja Kuse, Munich (DE); Stephan Savarese, Paris (FR)

(72) Inventors: Kolja Kuse, Munich (DE); Stephan Savarese, Paris (FR)

( * ) Notice: Subject to any disclaimer, the term of this patent is extended or adjusted under 35 U.S.C. 154(b) by 195 days.

(21) Appl. No.: 16/954,429

(22) PCT Filed: Dec. 17, 2018

(86) PCT No.: PCT/EP2018/000563
§ 371 (c)(1),
(2) Date: Jun. 16, 2020

(87) PCT Pub. No.: WO2019/115013
PCT Pub. Date: Jun. 20, 2019

(65) Prior Publication Data
US 2021/0079653 A1    Mar. 18, 2021

(30) Foreign Application Priority Data
Dec. 17, 2017 (DE) .................. 20 2017 006 477.4

(51) Int. Cl.
*E04C 5/07* (2006.01)
*B32B 13/02* (2006.01)
*B32B 9/00* (2006.01)
*B32B 9/04* (2006.01)

(52) U.S. Cl.
CPC .............. *E04C 5/073* (2013.01); *B32B 9/002* (2013.01); *B32B 9/047* (2013.01); *B32B 13/02* (2013.01); *B32B 2607/00* (2013.01)

(58) Field of Classification Search
CPC ......... E04C 5/073; B32B 9/002; B32B 9/047; B32B 13/02; B32B 2607/00
See application file for complete search history.

(56) References Cited

U.S. PATENT DOCUMENTS

| | | | |
|---|---|---|---|
| 6,660,384 B1 * | 12/2003 | Segura | C04B 28/02 428/688 |
| 6,897,123 B2 * | 5/2005 | Winther | H01L 21/2007 428/547 |
| 2001/0031336 A1 * | 10/2001 | Born | B32B 5/18 428/167 |

(Continued)

OTHER PUBLICATIONS

[NPL-1] "Square Metal 3/4 × 3/4 Mosaic Stainless Steel Tiles", The Builder Depot, Dec. 13, 2015; <http://www.thebuilderdepot.com/square-metal-mosaic-tiles-earthworks-series.html>. (Year: 2015).*

(Continued)

*Primary Examiner* — David Sample
*Assistant Examiner* — Donald M Flores, Jr.
(74) *Attorney, Agent, or Firm* — Perry + Currier

(57) ABSTRACT

This application discloses a new way of stabilizing concrete and cement-based materials and steel. The stabilization is carried out by reinforcement with the help of fiber-stabilized stone bars or stone slabs. The stone can be a natural stone or an artificial stone, the temperature expansion coefficient of which lies between that of the materials to be joined, that is, between the coefficient of the respective fiber and that of the respective cement-based building material, such as concrete or steel.

9 Claims, 5 Drawing Sheets

(56) References Cited

U.S. PATENT DOCUMENTS

2016/0040364 A1* 2/2016 Kuse .................. E01B 3/30
238/14.2

OTHER PUBLICATIONS

[NPL-2] "Coefficients of Linear Expansion", The Engineering Tool Box, Feb. 22, 2006; <https://www.engineeringtoolbox.com/linear-expansion-coefficients-d_95.html>. (Year: 2006).*

[NPL-3] "Sakrete Mortar/Stucco—Material Data Safety Sheet", NEXREG, Jan. 20, 2014; <https://www.sakrete.com/content/uploads/2021/07/Stone-Veneer-Mortar-SDS.pdf>. (Year: 2014).*

[NPL-4] "Aramid Fiber Reinforcements", HEXCEL, Jan. 28, 2017; <https://www.hexcel.com/Products/Fabrics-Reinforcements/Aramid-Fiber-Reinforcements>. (Year: 2017).*

[NPL-5] "Steel Rail and Sleeper"; Agico Group (Jul. 26, 2015), <http://www.railway-fasteners.com/steel-rail-and-sleeper.html>. (Year: 2015).*

[NPL-6] "Table of Coefficient of Expansion of Building Materials"; InspectAPedia (Feb. 23, 2023), <https://inspectapedia.com/exterior/Coefficients_of_Expansion.php>. (Year: 2023).*

[NPL-7] "10 Things You Need To Know About Carbon Fiber", MXA Motocross Action (Nov. 11, 2022), <https://motocrossactionmag.com/10-things-you-need-to-know-about-carbon-fiber-how-to-care-for-it/>. (Year: 2022).*

* cited by examiner

REINFORCEMENT FOR CEMENT- AND STEEL-BASED STRUCTURES

Steel reinforced concrete is a combination of cement-based mineral mix and steel reinforcement to give the mineral component the lack of tensile stability.

This means that the mineral component can absorb pressure without breaking or failing due to static or dynamic loads. Only then is the material able to be used in the construction sector for the construction of buildings, bridges and other structures and their components, such as ready-made beams, walls, ceilings, floors or railway sleepers.

The connection therefore works excellently under changing temperature conditions, which buildings are usually exposed to during operation, because the temperature expansion coefficients of approximately $10\text{-}12\times10^{-6}/K$ of steel and concrete are virtually identical.

For various reasons, the steel insert has its limits, on the one hand in terms of longevity, on the other hand, steel has come under the criticism of climate research because of the high CO2 emissions in the production of crude steel as a mass application, since around 50% of all steel produced today is used in the construction sector in form of reinforcement material for concrete.

In contrast to steel, other tensile materials can be used as reinforcement, which are less energy and CO2 intensive, but the excellent fit of the properties of steel with concrete is difficult to achieve with other materials.

For this reason, the invention proposed at this point to go one step further to provide materials with a method to replace steel in concrete structures and thereby become more environmentally friendly without simultaneously disruptively questioning too many industries to solve the CO2 problem. Initially, only the steel should be replaced as reinforcement for concrete.

The invention is based on the previous patented inventions of using fiber materials to stabilize stone materials of all kinds. This is namely EP 106 20 92, which describes how stone materials, such as those produced by nature, can be made flexible by reinforcement using carbon fibers. Stone and carbon have the perfectly fitting properties to remain stable over a wide temperature range without separating. The further invention EP 08 850 003.8 describes why this works. The porosity of the stone compensates for the different expansion coefficients through the volume compressibility as long as the stone is under pressure prestress. This manifests itself in the form of flexibility.

The new invention described here goes one step further and considers the elasticity modules of different materials not only under pressure, but also under tensile stress, since natural stone, for example, has a much higher tensile strength than cement or concrete. Natural stone, for example, not only has a specific weight equal to that of aluminum, which is surprising, even more surprising that it also has approximately the same stiffness or modulus of elasticity, depending on the type of granite, between 40 and 90 GPa. Pure aluminum is at 70 GPa.

This relatively high flexibility can be used without breaking as long as the pressure load limit of the stone is not exceeded in the pressure range and the tensile load limit of the stone in the case of tensile load. The knowledge used here includes that the stone is not only volume compressible, as described in EP 08 850 003.8, but can also be expanded in volume within its yield limits without breaking.

The stone becomes the balancing link between fibers and concrete or steel, which have different temperature expansion behavior. This enables long-fiber stabilized concrete structures to be used to replace, among other things. $CO_2$-intensive steel and to make building materials $CO_2$-negative if the fiber has bound carbon during production, as is the case with natural fibers and carbon fibers produced from $CO_2$. The stone preferably has a non-linear geometry and/or surface when the frictional connection between stone and concrete or cement is to be optimized. In the case of stabilization of steel, plates or strips of stone-carbon are preferably glued to the steel. This can preferably be done with epoxy resins. If the stabilized is in the form of rods of a wave shape, the elongation of the long fiber is made possible during expansion, which considerably improves the adaptation of the very different expansion coefficients of carbon fibers and concrete or steel.

Equipped with this inherent flexibility, the stone becomes the mediator of materials with different coefficients of expansion, because it has an expansion coefficient that is, for example, exactly between that of carbon and concrete. Thus the same also applies to steel. The stone can therefore not only serve as an intermediary between concrete and carbon fibers, but also as a mediator between carbon fibers and steel. This property becomes interesting, for example, for the renovation of bridges, not only those made of concrete, but also those made of steel. This makes the stone the mediator of the connection of different materials with different coefficients of thermal expansion, which, due to its volume compressibility under pressure and the relatively high elasticity under tension, which is controlled by the fiber, masters the power transmission without forming hairline cracks, also and especially not when large temperature changes mechanically stress the connection. This makes it possible to bring long carbon fibers into concrete and steel structures without the entire composite becoming detached from its respective composite partner at any point in the event of large temperature changes. The expansion coefficient of long carbon fibers is around $1\times10^{-6}/K$ and that of concrete, depending on the type of concrete, between $10\times10^{-6}/K$ to $12\times10^{-6}/K$.

If you choose the stone mediator with an expansion coefficient that is between 5 and $6\times10^{-6}/K$, which is the case with most natural stones, it is possible to concrete stabilize in a temperature range between $-40°$ C. and $80°$ C. without causing overloads at any boundary layer due to different changes in length, which leads to the breaking of the adhesive bonds between the materials. This creates the permanent connection between long carbon fibers and concrete or steel.

The proposed connection can also be used for the renovation of bridges made of concrete or steel, which can be made durable again with a glued-on bottom belt made of stone-carbon.

FIGS. 1 and 2 show a concrete module (1) which is stabilized with a strip of fiber-coated granite (2), whereby the carbon fiber layer (3), which is arranged between the two stone layers, has little or no direct contact with the concrete. The thickness of the stone layer determines the temperature range in which delamination stress is not exceeded by the differently expanding materials. The tolerable temperature range is greater, the greater the ratio of the thickness of the stone layers (also) in relation to the thickness of the carbon layer. The carbon layer is separated at the end faces, if necessary, by an elastic spacer (4) in the groove (5), in order to prevent the materials carbon and concrete from tearing off at this point, which could be a starting point for progressive damage. Corresponding corrugation of the carbon-stone structure and the resulting stretching of the carbon structure can greatly increase the uncritical temperature range and optimize the friction adhesion between stone and concrete in different stress conditions.

Figure 1:
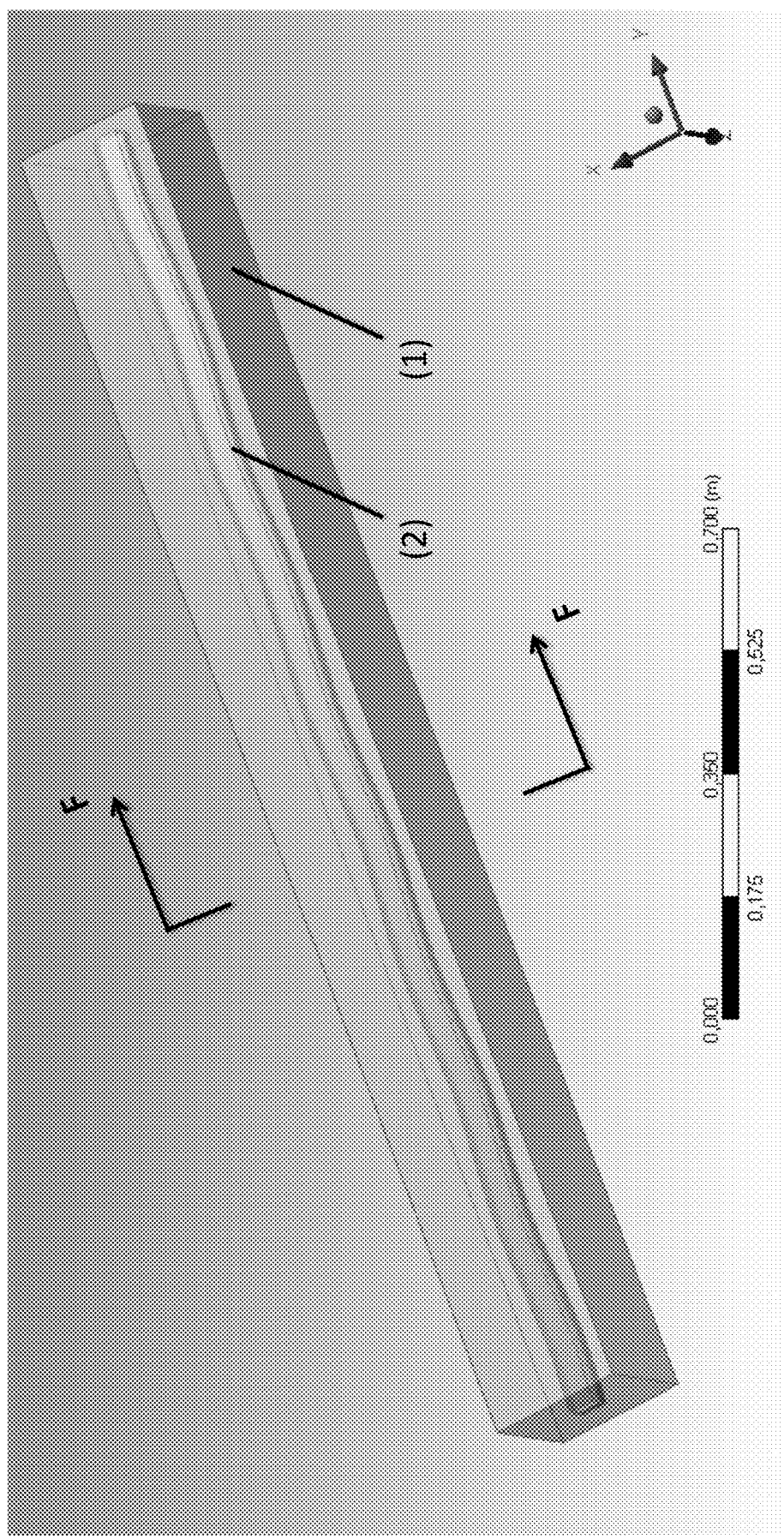
Figure 2:
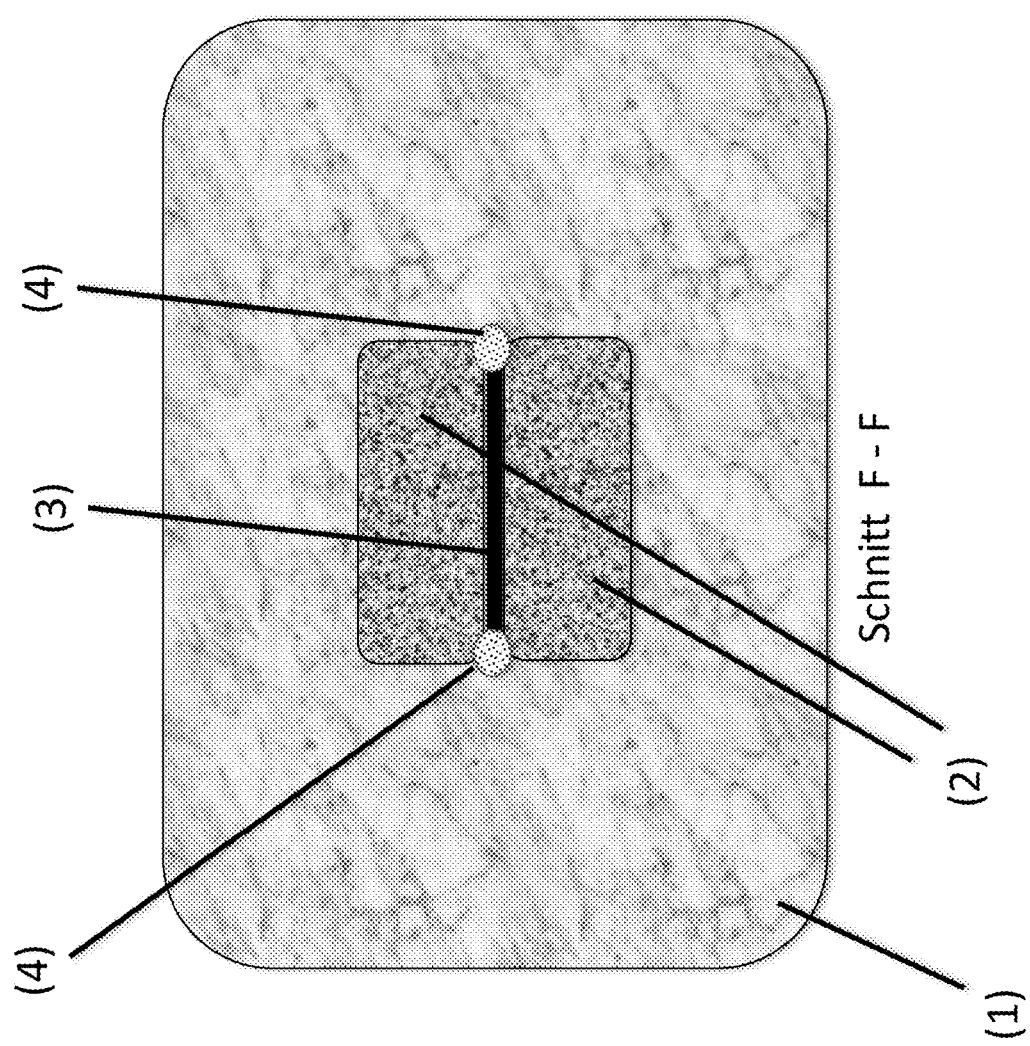
Figure 3:
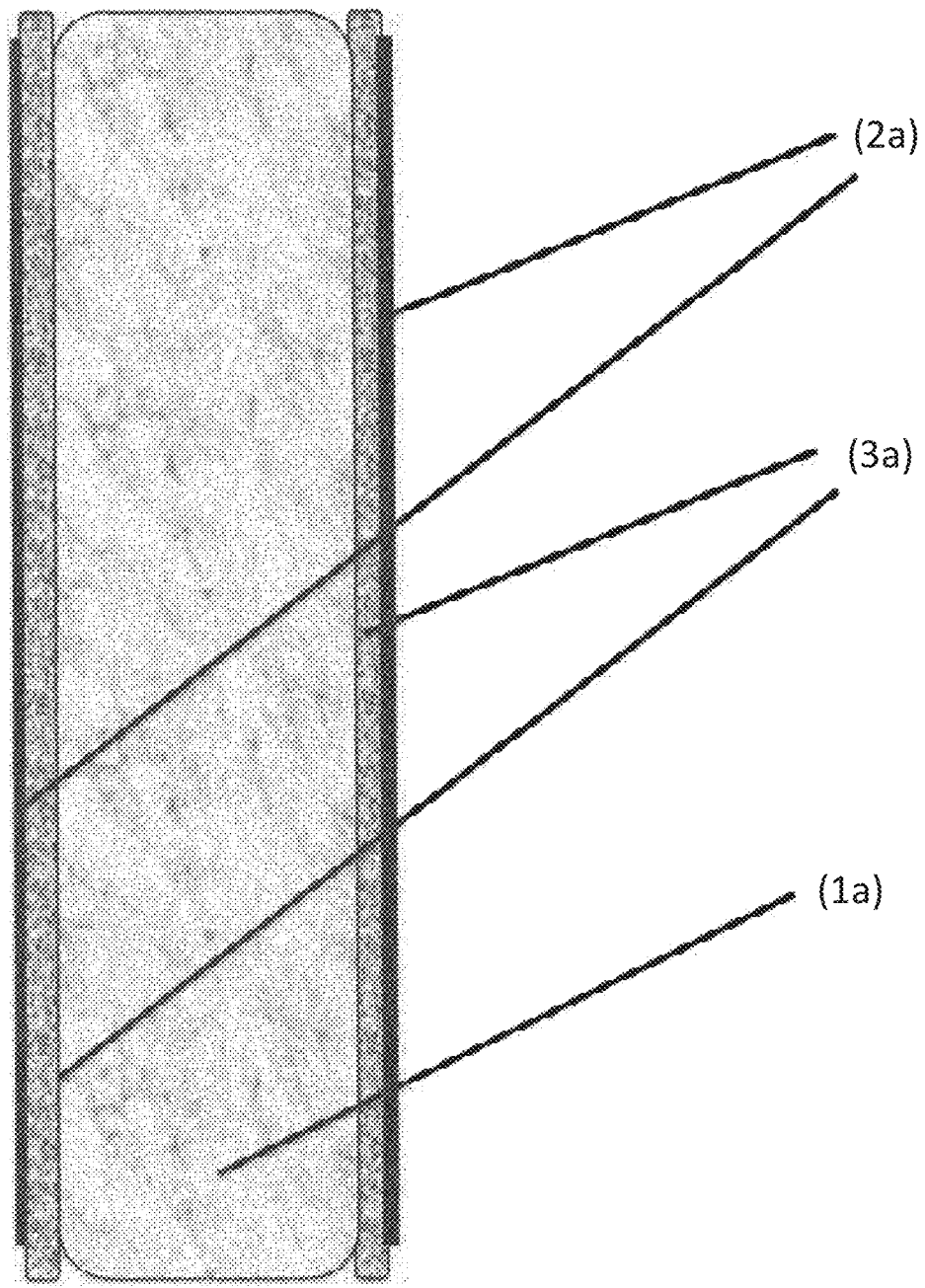
FIG. 3 shows the cross-section of a flat arrangement, such as a wall, in which the concrete structure (1a) is enclosed in two stone slabs (3a) coated with carbon (2a). Here, too, the direct contact between concrete and long carbon fiber is mechanically separated by an appropriately thick dimensioned stone layer.
Figure 4:
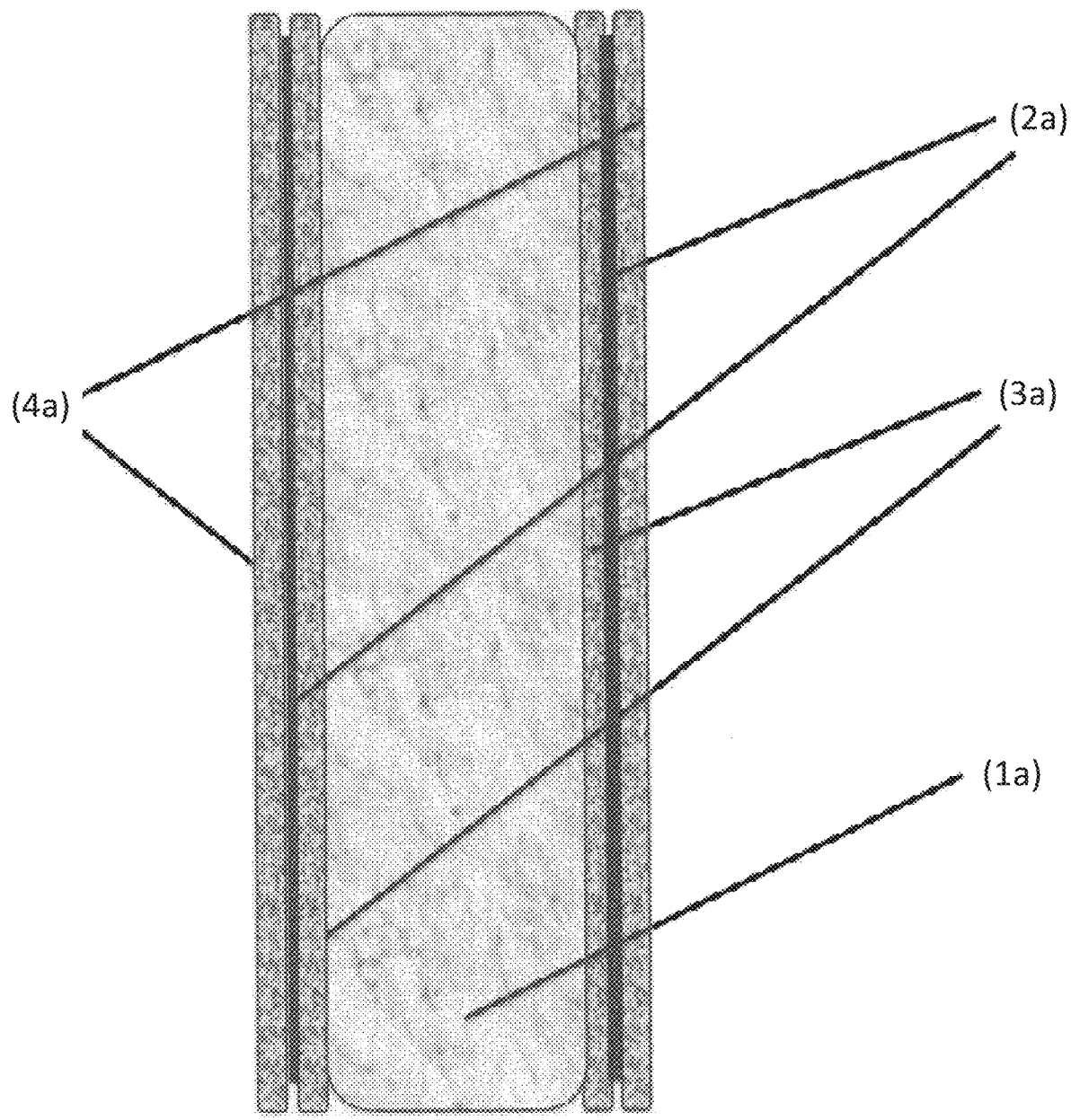
FIG. 4 shows the same structure as FIG. 3, but with a further layer (4a) made of stone, which protects the carbon layer from the weather influence and UV light.
Figure 5:
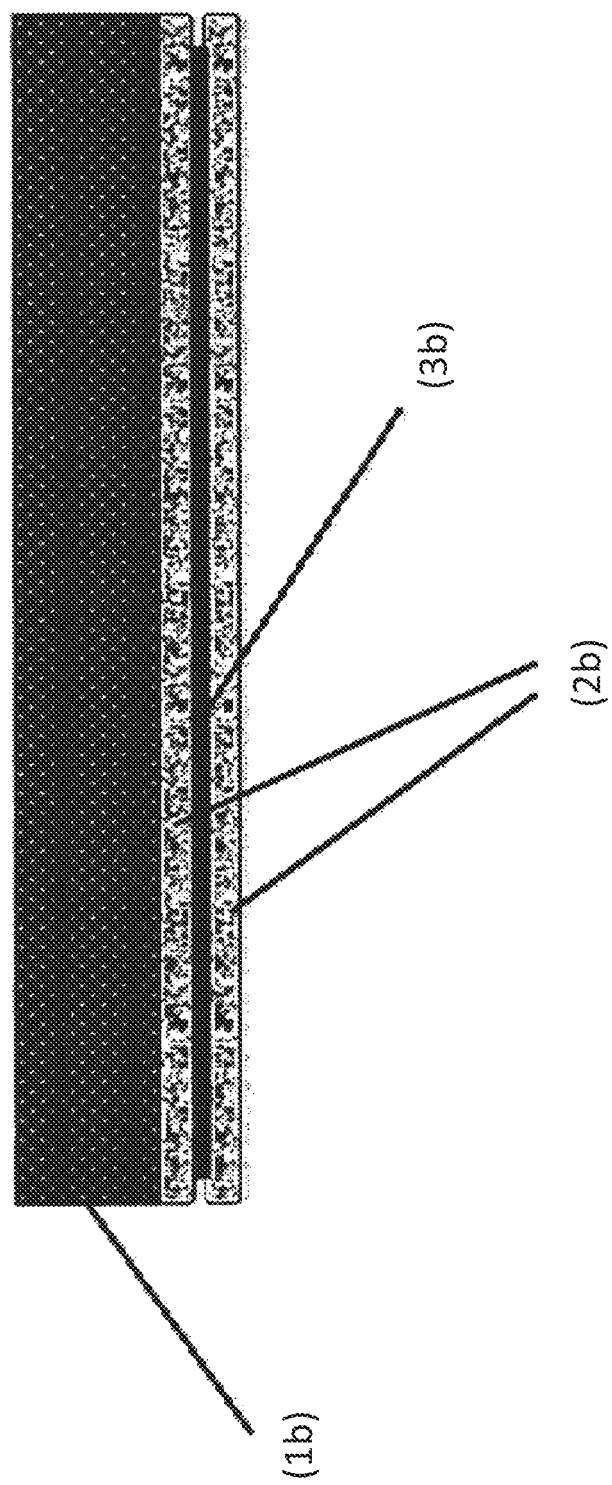

FIG. 5 shows a bar made of steel (b) with a layer of stone (2b) glued underneath and a layer of carbon fibers (3b) also attached underneath by gluing. The steel girder (1b) can expand when the temperature changes due to the high elasticity of a suitable stone material, without the carbon layer delaminating from the stone and without the steel beam having to bend if, for example, in the case of a support at both ends due to its own weight undergoes bending force in the opposite direction. Thanks to the stone layer that compensates for the expansion of the steel part, the steel beam can remain straight without tearing off the stabilizing carbon layer.

In all cases, the matrix-bonded long fiber layers can consist of carbon fibers, glass fibers or stone fibers, or a mixture of these fibers and ideally hold the stone material under prestress, as described in EP 08 850 003.8. The ideal frictional connection between cement and stone is established when the stone has a rough surface and ideally does not have a completely linear shape, i.e. has grooves at regular intervals on both sides or the surfaces and/or has a waveform, if necessary, that increases the frictional connection of stone and concrete and allows for a stretching of the fiber. The matrix, which creates the connection between the fibers and the stone material, consists either of synthetic resins or water glass-based binders, here too a rough stone surface is helpful. All high-tensile long fibers are usable, which can be used as a replacement for steel for the reinforcement of concrete, these include in particular carbon fibers, but also highly rigid glass fibers and stone fibers or possibly natural fibers or a mixture of these fibers.

If the carbon fibers or hemp fibers are made from biomass and thus have a negative CO2 balance, then climate protection can be supported by replacing steel with a positive CO2 balance. Ideally, cement-based materials are also used here, which cause low CO2 emissions or which will also be produced in a CO2-negative manner for the duration of the life cycle.

The invention claimed is:

1. An arrangement with a plate or a block or whatever geometry of a component made of concrete or cement-based mineral, which is stabilized with the help of fiber materials, characterized in that as an intermediate layer, between concrete or cement-based mineral and the fiber materials, a natural stone material is used with a temperature expansion coefficient which lies between the respective temperature expansion coefficient of the concrete used in each case and the temperature expansion coefficient of the respective fiber materials used in each case;
   wherein the fiber materials and the natural stone material are cast in the concrete or the cement-based mineral.

2. The arrangement according to claim 1, characterized in that the fiber materials are either carbon fibers, glass fibers, stone fibers or natural fibers or a mixture of these fibers.

3. The arrangement according to claim 1, characterized in that the natural material is prestressed by the fiber materials.

4. The arrangement according to claim 1, characterized in that the fiber materials are bound with resin or water glass and connected to the natural stone.

5. The arrangement according to claim 1, characterized in that the fiber materials and the natural stone material are attached to the surface of the component made of concrete or cement-based mineral.

6. The arrangement according to claim 1, characterized in that the natural stone material has a rough surface.

7. The arrangement according to claim 1, characterized in that the natural stone material has a non-linear shape.

8. The arrangement according to claim 7, characterized in that natural stone material has a wave shape.

9. The arrangement according to claim 1, characterized in that the natural stone material has grooves, notches or depressions at certain intervals, which improve the adhesion between the natural stone material and the component made of concrete or cement-based mineral.

* * * * *